United States Patent [19]

Fox

[11] Patent Number: 5,688,449
[45] Date of Patent: Nov. 18, 1997

[54] METHOD OF FORMING AND EXTRUDING AN ADDITIVE-COATED RESIN COMPOSITION

[75] Inventor: Steve A. Fox, Hickory, N.C.

[73] Assignee: NiTech Corporation, Hickory, N.C.

[21] Appl. No.: 537,988

[22] Filed: Oct. 2, 1995

[51] Int. Cl.⁶ .................... B29C 44/20; B05D 7/00
[52] U.S. Cl. .................. 264/54; 264/211; 427/214; 427/222; 521/57
[58] Field of Search .................. 264/123, 54, 211; 427/214, 222; 521/57

[56] References Cited

U.S. PATENT DOCUMENTS

| | | | |
|---|---|---|---|
| 217,994 | 7/1879 | Crump. | |
| 2,214,405 | 9/1940 | Coffman | 260/33 |
| 2,861,046 | 11/1958 | Stastny | 427/222 |
| 3,012,900 | 12/1961 | Kleinmann et al. | 117/4 |
| 3,154,604 | 10/1964 | McMillan | 427/222 |
| 3,185,588 | 5/1965 | Resnick | 117/100 |
| 3,245,829 | 4/1966 | Beaulieu | 427/222 |
| 3,723,153 | 3/1973 | Nagata et al. | 117/21 |
| 3,967,005 | 6/1976 | Cattaneo | 427/202 |
| 4,107,382 | 8/1978 | Augustine et al. | 428/368 |
| 4,359,492 | 11/1982 | Schlademan | 427/222 |
| 4,448,900 | 5/1984 | Schwarz | 521/57 |
| 4,533,562 | 8/1985 | Ikegami et al. | 427/3 |
| 4,880,470 | 11/1989 | Hyche et al. | 106/271 |
| 4,960,644 | 10/1990 | Hyche et al. | 428/407 |
| 4,975,120 | 12/1990 | Hyche et al. | 106/271 |
| 4,989,616 | 2/1991 | Hyche et al. | 106/271 |
| 5,006,565 | 4/1991 | Tusim et al. | 521/57 |
| 5,007,961 | 4/1991 | Hyche et al. | 106/18 |
| 5,082,608 | 1/1992 | Karabedian et al. | 264/211 |
| 5,096,493 | 3/1992 | Hyche et al. | 106/271 |
| 5,116,547 | 5/1992 | Tsukahara et al. | 264/211 |
| 5,190,579 | 3/1993 | Gose et al. | 106/118 |
| 5,200,270 | 4/1993 | Ishida et al. | 428/403 |
| 5,236,649 | 8/1993 | Hall et al. | 264/211 |
| 5,273,824 | 12/1993 | Hoshino et al. | 106/409 |
| 5,334,644 | 8/1994 | Gose et al. | 524/487 |
| 5,443,910 | 8/1995 | Gose et al. | 428/407 |
| 5,454,864 | 10/1995 | Whalen-Shaw | 106/416 |
| 5,455,288 | 10/1995 | Needham | 523/205 |
| 5,498,663 | 3/1996 | Shimada et al. | 525/543 |
| 5,530,041 | 6/1996 | Minghetti et al. | 524/81 |
| 5,536,576 | 7/1996 | Hishida | 428/403 |
| 5,585,184 | 12/1996 | Baker et al. | 428/407 |

FOREIGN PATENT DOCUMENTS

| | | | |
|---|---|---|---|
| 9217259 | 12/1992 | Australia | 521/57 |
| 613255 | 1/1961 | Canada. | |
| 697168 | 11/1964 | Canada | 117/36 |
| 727178 | 2/1966 | Canada | 400/6 |
| 873290 | 6/1971 | Canada | 117/45 |
| 1200535 | 9/1965 | Germany. | |
| 56-95936 | 8/1981 | Japan | 521/57 |

OTHER PUBLICATIONS

Eastman Chemical Company, "Polymer Powder, Pellets, and Spheres", Publication AP–21A, pp. 3, 5, 6, 7, and 9–16 (Apr., 1995).

Dock Resins Corporation, "Doresco (R) ACW8–6" (Oct. 5, 1992) Rohm and Haas Company, The Strongest Bonds Start Here (Undated).

Reichold Coating Polymers & Resins Division, "SPENSOL° L53–MPW–30" (Jun., 1993).

Rohm and Haas Company, "Formulators Guide for High Performance Waterborne Acrylic Lacquers Based on RHOPLEX WL Emulsions" (1990).

Rohm and Haas Company, "Product Specifications for ROVACE 661 (7–4504)" (Dec. 17, 1993).

Reichold Coating Polymers & Resins Division, "SPENSOL° L52–MPW–30" (Undated).

Feiring et al., "Advances in Fluoroplastics" *Materials* (Jun., 1994).

Rohm and Haas Company, "RHOPLEX and ROBOND Acrylic Emulsion Adhesives" (Undated).

Quantum Chemical Company, "Spectratecho Foam Concentrates" (Undated).

Rohm and Haas Company, "Acrysol Thickeners/Rheology Modifiers" (Undated).

Quantum Chemical Company, "Spectratecho FM 2169H" (Undated).

Quantum Chemical Company, "Spectratecho FM 2171H" (Undated).

Quantum Chemical Company, "Spectratecho FM 2182H" (Undated).

Uniroyal Chemical Company, Inc., "Technology of Celogen Blowing Agents" (Aug., 1992).

Uniroyal Chemical, "Foaming Agents —Selector Guide" (1994).

James Ahnemiller, "Precision Profile Extrusion of Foam Techniques and Theory" (Dec. 7, 1994).

*Primary Examiner*—Allen R. Kuhns
*Attorney, Agent, or Firm*—Richard E. Jenkins, P.A.

[57] ABSTRACT

A polymeric resin composition comprising a polymeric resin in particulate form coated with an additive agent adhered to the surfaces of the resin particles by a coating of thermoplastic adhesive binder between the particles and the agent.

13 Claims, No Drawings

METHOD OF FORMING AND EXTRUDING AN ADDITIVE-COATED RESIN COMPOSITION

TECHNICAL FIELD

This invention relates, in general, to a polymeric resin composition in particulate form and containing one or more additives, as well as a method to manufacture such compositions. More particularly, the invention relates to polymeric resin particles coated with adhesive binder and additive(s).

BACKGROUND ART

It has long been commercial practice, depending on the end use of an extruded polymeric plastic, to incorporate into the polymeric resin particles one or more of various additives. The additive is incorporated into the polymeric resin particles (i.e., flakes, granules, pellets, beads, and the like) by compounding with heat, optionally including a solvent, in a kettle, a blender, or a twin screw extruder.

Typically, the temperature for admixing the additive and polymeric resin ranges from about 50° C. to about 290° C., more typically about 100° C. to about 250° C., and even more typically from about 180° C. to about 220° C. The resultant admixed additive and polymer can then be formed into pellets (for instance, by extruding a ribbon of resin having additives compounded therein, after which the ribbon is cut into small pellets) and then stored for later use to manufacture flexible plastic films, foamed (also known as expanded) plastic profiles, and like (for instance, later use with the tubular or planar extruders employed in commercial plants for extruding resin pellets into a flexible plastic film or into a foamed plastic profile).

More specifically, Canadian Patent No. 727,178, issued Feb. 1, 1966 to Pazinski, discloses simultaneously mixing in a blender particles of thermoplastic resin, a powdery blowing agent additive (i.e., azobisformamide), and a waxy material for adhesion, with heat at a temperature above that at which the waxy material melts but below that at which the resin sinters, in order to form a coating of the blowing agent on the resin particles. The resultant expandable resin containing the blowing agent incorporated therein can then be made into a foamed (i.e., cellular) plastic, such as foamed polypropylene, foamed polyvinyl chloride, or foamed polyethylene, by conventional extrusion means.

Also, German Patent Publication No. 1,200,535, published Sep. 9, 1965 to Beersma, shows expandable polystyrene beads (already containing a volatile hydrocarbon as a foaming actuator added by conventional means), simultaneously mixed with a flame retardant agent additive (i.e., a mixture of powdery antimony oxide and a liquid chloroparaffin), and methyl cellulose or ethylhydroxyethyl cellulose for adhesion, in order to form a coating of the flame retardant agent on the polystyrene particles. The resultant is air dried with heat at 30° C., and then formed into a prefoam by means of steam heating at 98° C. The prefoam is then put into a mold and treated with steam and pressure to form foamed polystyrene of desired shape.

Of interest, Canadian Patent No. 613,255, issued Jan. 24, 1961 to Brossman et al., shows a thermoplastic molding composition of granular resin that has pigment (an additive agent) and silicone oil (for adhesion) uniformly incorporated therein by mixing a resin, such as nylon flake, in a double cone blender simultaneously together with the oil and the pigment, melting the resultant at about 550° F. (288° C.), and then forming a ribbon that is quenched in water and then cut by a dicer to give granules.

Additionally, of interest is Canadian Patent No. 697,168, issued Nov. 3, 1964 to Brossman et al. This patent shows an aromatic sulfonamide, namely N-substituted toluenesulfonamide, used as an adhesive binder liquid that is tumbled in a drum with nylon flake under a dry nitrogen gas atmosphere, followed by adding pigment particles to the drum and then continuing the tumbling under a dry nitrogen gas atmosphere. Subsequently, the nylon granules having finely-divided pigment additive bound to the surfaces thereof by a coating of the N-substituted toluenesulfonamide are formed into a ribbon at 300° C., followed by the ribbon being cut into small granules. It is noted that a drawback of the disclosure of Canadian Patent No. 697,168 is the special closed containers for the dry nitrogen gas atmosphere, as undesirable interparticle sticking would occur with use of the N-substituted toluenesulfonamide binder in an ambient atmosphere.

It is further noted aromatic sulfonamides (which are not thermoplastic materials) have long been known for use as additive agents (i.e., use as plasticizers) with nylon, for instance, as shown in U.S. Pat. No. 2,214,405 to Coffman. More particularly, this patent shows polyamides (i.e., nylons) plasticized with aromatic sulfonamides by mixing the aromatic sulfonamide in a solution with an alcohol solvent (such as phenol), and heating the solution, for instance at 265°–270° C., together with the nylon.

Commercial methods, as described above, for admixing additives into resins have many disadvantages, particularly when the additives are blowing agents. For instance, disadvantages include that many additives during compounding into the resin pellets thermally decompose when heated to standard compounding temperatures, as a result of which the additive is no longer useful as a blowing agent.

Hence, waxes are often added to lower the compounding temperatures as well as to enhance adhesion of the additives, but the waxes can affect the properties of the final product, and in certain instances, cause screw slip during extrusion (i.e., the loss of friction and consequent reduced output) into a foamed profile or flexible plastic film. Also, the use of oils to enhance adhesion can cause screw slippage, as well as agglomeration of the resin pellets in the extruder throat and/or smoking as the product exits the extruder die and/or pin holes in the end plastic product. Thus, waxes and oils are undesirable.

Another disadvantage is that after compounding of the additive into the resin, the resultant typically is not in pellet form but rather is a mass. Hence, the resultant needs to be extruded into a ribbon, which is subsequently cut into short lengths, i.e., ⅛ inch (0.32 cm), of pellets that then can be stored and later used for extrusion, with a tubular or planar extruder, into a flexible plastic film or into a foamed plastic profile.

Accordingly, there has been a long-felt need for a simple method and resultant particulate product involving the addition of various agents, particularly blowing agents, to polymeric resins that obviates the prior art problems from heating the resins in a blender, from use of oils, waxes, and sulfonamides the like, and from the need to form the resultant resin compounded with additive into a ribbon that is then cut into pellets.

SUMMARY AND OBJECTS OF THE INVENTION

Therefore, the present invention provides a polymeric resin composition comprising a polymeric resin in particulate form having a coating of thermoplastic adhesive binder suitable for extrusion directly adhered to the surfaces of the resin particles and having a coating of additive agent directly adhered onto the coating of binder.

Additionally, the present invention provides a method for uniformly distributing additive agents on polymeric resin to form an extrudable thermoplastic resin composition. The method comprises first contacting a polymeric resin in particulate form with a thermoplastic adhesive binder to form a coating of the binder directly adhered onto the resin particles. Then, the method comprises contacting the binder-coated resin particles with an additive agent to form a uniform coating of the additive agent directly adhered onto the binder coating of the binder-coated resin particles.

Furthermore, the present invention provides a method for manufacturing an extruded plastic product. The method comprises first uniformly distributing additive agents on polymeric resin to form an extrudable thermoplastic resin composition by (i) contacting a polymeric resin in particulate form with a thermoplastic adhesive binder to form a coating of the binder directly adhered onto the surfaces of the resin particles, followed by (ii) contacting the binder-coated resin particles with an additive agent to form a uniform coating of the additive agent directly adhered onto the binder coating of the binder-coated resin particles. Next, the method comprises extruding the resultant resin particles having a coating of additive agent directly adhered onto the coating of binder that is directly adhered to the surfaces of the resin particles to form an extruded plastic product.

Accordingly, it is an object of the present invention to provide polymeric resin particles coated with a binder and an additive agent by a method that does not require heating or a special gas blanket, and thus, the method can be carried out at ambient conditions of temperature and in the ambient atmosphere.

Hence, since heat is not necessary, it is an advantage of the present invention to provide polymeric resin particles coated with a binder and an additive agent by a method that avoids problems of certain adhesive binders and/or additive agents being adversely affected by heat during compounding with resin particles.

It is another advantage of the present invention, that since the resultant resin particles coated with a binder and an additive agent are already in particulate form, they are in a form ready for extrusion into a flexible plastic film or a foamed profile and there is no need to extrude the resultant into a ribbon that is then cut into pellets.

It is a feature of the present invention that the resultant resin particles coated with a binder and an additive agent are typically dry and non-tacky, and thus, typically exhibit dust-free and free-flowing behavior.

Some of the objects and advantages of the invention having been stated, other objects will become evident as the description proceeds, in connection with the Laboratory Examples described below.

DETAILED DISCLOSURE OF THE INVENTION

The polymeric composition of the present invention includes polymeric resin particles, such as flakes, granules, pellets, beads, and the like, coated with a thermoplastic adhesive binder and an additive agent. Resin particles are first coated with the binder, for instance by tumbling the two ingredients in a drum, and second, a coating of an additive agent, such as a powdery blowing agent, is applied, such as by sprinkling it onto the coated mixture in the drum, with tumbling. The binder causes the additive agent to adhere to the binder of the binder-coated resin particles. Large drums that slowly rotate are commercially available, and include an inlet for warm air, if desired, to be forced into the drum.

Thus, the coated particles are in a form that is substantially concentric, for instance, like the layers of an onion. In other words, the resin particle is inside, and over the particle is the coating of binder, and over the binder coating is the coating of additive agent.

The resultant is then removed from the drum and, if the binder and/or additive agent is in aqueous form (and/or with a solvent other than water) as further described below, allowed to dry, typically by spreading it out on a screen and leaving it to dry for about 0.25 to 3 hours. Longer drying times may be employed with large amounts (i.e., hundreds of pounds) of resin, binder, and additive agent. The drying can simply be air drying at standard room temperature of about 72° F. (22.2° C.), but can be at ambient temperatures, including with heat, such as at about 80° F. (26.7° C.) to about 100° F. (37.8° C.), or even higher. Higher temperatures will lessen the drying time. Alternatively, the drying may be achieved by continuing to rotate the drum, optionally with forcing warm air into the drum to achieve quicker drying.

In the method for contacting the resin particles with binder and then contacting the binder-coated particles with additive agent, there is no need for adding heat or pressure during formation of the composition. Moreover, the method can be carried out in the ambient atmosphere since there is no need, for instance, for a blanket of nitrogen gas, as in the above-noted Canadian Patent No. 697,168 to Brossman et al.

As noted, the contacting with binder and then with additive agent is advantageously accomplished in a drum, with rotating to help create uniform distribution of the binder and the additive agent. The rotation should be for a time sufficient to achieve uniform coating, and typically the drum is rotated from about 1 to about 20 minutes, more typically about 5 to about 10 minutes, per coating. Of course, on a factory scale with large amounts (i.e., hundreds of pounds) of resin, binder, and additive agent, the rotating may be longer (¼ to ½ hour, or even longer) to help achieve uniform coating.

The resultant resin coated with adhesive binder and additive agent is suitable for extrusion into a plastic product, such as a flexible plastic film, a foamed plastic profile (i.e., a sheet or ribbon), and the like, by well known extrusion processes using conventional extrusion equipment, the type of plastic product depending on the particular type of polymeric resin particles and the particular type of additive agents.

As is well known, extruders commercially employed in plants form polymeric resin pellets into the end product plastic by methods that are tubular and/or planar. It is noted that, if flexible plastic film is being manufactured, the film may be made as a heat-shrinkable "oriented" film or may be made as a non-heat-shrinkable "non-oriented" film by well known extrusion methods. Also, the flexible plastic film may be single layer or multi-layer, depending on the type of extrusion. It is also noted that examples of foamed profiles are foamed trays, such as those used under vegetables at grocery stores, and insulative coatings, such as those used for coating electrical cables and wires. Densities of foam profiles may be as also as about 1 pound per cubic foot (15 kg per cubic meter).

Further, if desired, the resultant resin coated with adhesive binder and additive agent may be extruded into a ribbon, and then, cut into pellets. For instance, a ribbon would be formed and then cut into pellets when it is desired to have pellet particles of a size different from that of the particles of the resultant resin coated with adhesive binder and additive agent.

The terms "polymer" or "polymeric resin" as used herein generally include, but are not limited to, homopolymers, copolymers, such as, for example block, graft, random and alternating copolymers, terpolymers, et cetera, and blends and modifications thereof. Furthermore, the terms "polymer" or "polymeric resin" shall include all possible structures of the material. These structures include, but are not limited to, isotactic, syndiotactic, and random symmetries.

Various polymeric resins are suitable for use in the present invention. Examples of such resins, include, but are not limited to, polystyrene (abbreviated herein as PS), butadiene-styrene copolymer (abbreviated herein as BS), acrylonitrile-butadiene-styrene terpolymer (abbreviated herein as ABS), ethylene vinyl acetate copolymer (abbreviated herein as EVA), polytetrafluoroethylene-co-hexafluoropropylene (abbreviated herein as FEP), polyvinyl chloride (abbreviated herein as PVC), polyamide (also known as nylon), polypropylene (abbreviated herein as PP), polyethylene (abbreviated herein as PE), and combinations thereof.

As is well known to those of ordinary skill in the art, the PE may be high density polyethylene, medium density polyethylene, low density polyethylene, as well as the newer type of structures referred to in the art as linear low density polyethylene and/or linear very low density polyethylene. (Linear very low density polyethylene is also called linear ultra low density polyethylene.) Also, as is well known to those of ordinary skill in the are, it is noted that BS and ABS are rubbery materials, such as that sold under the registered trademark SANTOPRENE by Advanced Elastomer Systems.

The adhesive binder is a thermoplastic material that is extrudable, for instance when used in the tubular and/or planar extruders commercially employed for extruding polymeric resin pellets into the end product of a flexible plastic film and/or a foamed plastic profile. The thermoplastic adhesive binder will not cause problems in the extruder (i.e., screw slippage or smoking) and will not cause problems in the end plastic product (i.e., pin holes in the film).

The adhesive binder may be in the form of a solution, emulsion, or dispersion in water and/or other solvents. Adhesive binders in the form of dry powders may be employed by admixing with water and/or other solvents. Suitable solutions, emulsions, or dispersions are about 30 to about 55% solids, with the remainder being water and/or another solvent.

Examples of binders useful in the present invention include, but are not limited to vinyl acetate homopolymers, polyurethanes, polyacrylics, and combinations thereof.

A suitable vinyl acetate homopolymer is available as an emulsion under the trade name ROVACE 661 from Rohm and Haas Company of Philadelphia, Pennsylvania. ROVACE 661 is about 55% by weight of vinyl acetate homopolymer in water, has a pH of about 4.5 to 5.0, and a viscosity of about 600 to 1500 centipoise at 20 rpm and 25° C. on a Brookfield RV spindle #3.

A suitable polyurethane is available as a dispersion under the registered trademark SPENSOL L52-MPW-30 from Reichhold Chemicals, Inc. of Research Triangle Park, N.C. SPENSOL L52-MPW-30 is an elastomeric dispersion of about 30% solids polyurethane in a blend of water and N-methylpyrrolidone and amine solvents, has a pH of about 7.5 to 9, and has a viscosity of about 0.3 to 1 stoke at 25° C.

Suitable polyacrylics are available as aqueous dispersions of rosin ester resins under the registered trademark DORESCO ACWS-6 from Dock Resins Corporation of Linden, N.J., and as polyacrylic based water emulsions under the trade name RHOPLEX WL from Roban and Haas Company of Philadelphia, Pa.

It is preferred that the amount of adhesive binder be about 30 to 50, more preferably about 40, parts by weight per about 100 parts by weight of the additive agent employed. In other words, if about 10 parts by weight of additive agent as compared to about 100 parts by weight polymeric resin is employed, then about 4 parts by weight of the adhesive binder should be employed, whereby the resultant final product of polymeric resin, adhesive binder, and additive agent contains about 2% by weight of the adhesive binder. It is noted that at least about 1 part by weight of additive agent and about 0.4 parts by weight of adhesive binder per about 100 parts by weight of resin particles should be employed to achieve coated particles having a sufficient amount of additive agent so that the agent is effective in its desired end use.

It has been found that for a single pass coating of additive agent onto polymeric resin particles, up to about 10 parts by weight of the additive agent per about 100 parts by weight of polymeric resin can be employed without the additive agent flaking off from the polymeric resin particles. However, the process of adding the adhesive binder and then the additive agent can be repeated so that polymeric resin particles already coated can be coated again with adhesive binder and then additive agent up to about 20 parts by weight, about 40 parts by weight, about 60 parts by weight, or even higher of additive agent to about 100 parts by weight of polymeric resin particles. Accordingly, different additive agents can be added incrementally to the same polymeric resin particles. For instance, polyethylene particles can first be coated with azodicarbonamide powder as the additive agent, and then coated with a mixture of encapsulated sodium bicarbonate/citric acid powder as the additive agent.

The smaller the polymeric resin particles are, then the higher will be the surface to volume ratio of the particles. For instance, if the particle is assumed to be spherical, and the coating of additive agent is considered to be uniform, then the volumetric ratio of coating to particle is approximately 3 times the coating thickness divided by the radius of the sphere for thin coatings. Therefore, if the particle radius is 0.06 inch (0.15 cm), then for a coating thickness of 0.002 inch (0.005 cm), a 10% volumetric ratio of additive agent to particle will be achieved. On the other hand, if the particle radius is 0.03 inch (0.08 cm), the same 0.002 inch (0.005 cm) thickness of additive agent coating will yield a 20% by volume of additive agent to particle. Consequently, higher loadings of additive agent can be achieved with smaller particles for a given coating thickness.

The additive agents may include, but are not limited to, anti-blocking agents, antifogging agents, slip agents, antimicrobial agents, pigments, flame retardants, antioxidant agents, nucleating agents, heat stabilizers, impact modifiers, plasticizers, lubricants, thickeners, ultra-violet stabilizers, anti-static agents, wetting agents, and combinations thereof.

In particular, suitable as nucleating agents (also known as foaming agents or expanding agents or blowing agents), are azodicarbonamide (available as a powder under the registered trademark CELOGEN AZ 130 from Uniroyal Chemical of Middlebury, Conn.), a mixture of sodium bicarbonate and citric acid encapsulated powder (available under the trade name UNICELL-C#850 from Dong Jin, of Seoul, Korea), or boron nitride (available as a powder under the trade name SHP 325 from Carborundum). As is well known, when a polymeric resin containing azodicarbonamide, for instance to a temperature of 380° F. (193° C.), then nitrogen gas is released causing foaming or expanding of the polymer. Likewise, as is well known, mixtures of sodium bicarbonate and citric acid powder release carbon dioxide gas for foaming or expanding the polymer. In other words, the azodicarbonamide and the mixture of sodium bicarbonate and citric acid are chemical type nucleating agents.

Other suitable nucleating agents are a physical type, such as boron nitride (available as a powder under the trade name SHP 325 from Carborundum), talc, and polytetrafluoroethylene powder (available in 3 micron particulate form under the registered trademark TEFLON fluoroadditive from DuPont of Wilmington, Delaware).

Nucleating agents are often used in combination with a gas, such as nitrogen, carbon dioxide, pentane, butane, a chlorofluorocarbon (i.e., those sold under the registered trademark FREON by DuPont), and the like, which is injected into the extruder during formation of a profile.

Representative laboratory examples are set forth below for a better understanding and appreciation of the present invention.

LABORATORY EXAMPLES

Example 1

A) Preparation of resin pellets with adhesive binder.

50 pounds (22.7 kg) of high density fraction melt polyethylene pellets (Union Carbide DFDA 3364 polyethylene) having a generally cylindrical shape of about 0.150 inch (0.381 cm) diameter×about 0.160 inch (0.406 cm) long average length, were placed in a drum mixer of 18 inch (45.7 cm) diameter. 2.32 pounds (1.05 kg) of 55% by weight vinyl acetate emulsion (Rohmand Haas ROVACE 661) were added as an adhesive binder to the pellets by pouring over the surface of the pellets. The drum mixer was then rotated for 5 minutes until the pellets were uniformly coated.

B) Coating of additive agent.

5.8 pounds (2.63 kg) of 3.0 micron average particle size azodicarbonamide powder (Uniroyal AZ 130) as a foaming (i.e., expanding) agent were then sprinkled over the coated pellets while the mixer was rotating. Rotation was continued for 10 minutes until the pellets were uniformly coated and no dust or sticking occurred. The mixture was removed from the drum mixer and spread onto a screen wire mat in a layer about 1.5 inches (3.8 cm) deep.

C) Drying.

The mixture was then dried on the screen at room temperature of approximately 80° F. (26.7° C.) for about 1 hour. A 20 inch (50.8 cm) diameter fan was used to circulate the air. Moisture tests were made and the mixture was found to be below 0.4% moisture after drying.

D) Testing.

One part by weight of this mixture was then mixed with 10 parts by weight of natural polyethylene pellets (Union Carbide DFDA 3364 polyethylene). This mixture was then extruded in a 1.25 inch (3.18 cm) diameter 24:1 length:diameter single screw extruder through a round circular artifice of 0.125 inch (0.318 cm) diameter at a melt temperature of about 400° F. (204° C.) into a water bath for cooling. The extrudate of foamed polyethylene exhibited fine, uniform cells of about 100 micron size with a density of about 0.47 grams per cubic centimeter, which is about a 50% reduction as compared to the density of 0.955 grams per cubic centimeter of the DFDA 3364 polyethylene.

Example 2

A) Preparation of resin pellets with adhesive binder.

50 pounds (22.7 kg) of low density polyethylene pellets (available as NA206 from Quantum) having a pellet diameter of about 0.19 inch (0.48 cm) and a length of about 0.13 inch (0.33 cm) were placed in a drum mixer of 18 inch (45.7 cm) diameter. 2.32 pounds (1.05 kg) of 55% by weight vinyl acetate emulsion (Rohm and Haas ROVACE 661) were added as an adhesive binder to the pellets by pouring over the surface of the pellets. The drum mixer was then rotated for 5 minutes until the pellets were uniformly coated.

B) Coating of additive agent.

5.8 pounds (2.63 kg) of encapsulated mixture of sodium bicarbonate/citric acid powder as a foaming (i.e., expanding) agent (available as Unicell-C#850 from Dong Jin) were then sprinkled over the coated pellets while the mixer was rotating. Rotation was continued for 10 minutes until the pellets were uniformly coated and no dust or sticking occurred. The mixture was removed from the drum mixer and spread onto a screen wire mat in a layer about 1.5 inches (3.81 cm) deep.

C) Drying.

The mixture was then dried on the screen at room temperature of approximately 80° F. (26.7° C.) for about hours. A 20 inch (50.8 cm) diameter fan was used to circulate the air. Moisture tests were made and the dried mixture the was found to be below 0.8% moisture after drying.

D) Testing.

One part by weight of this mixture, to be used as a foam nucleating agent, was then mixed with 10 parts by weight of natural polyethylene pellets (Quantum NA206). This mixture was then extruded in a 3.5 inch (8.9 cm) diameter single screw foam extruder, in combination with isobutane being pumped into the heated barrel of the extruder, to form a profile of foamed polyethylene, with a cross section of about 1.5 inch×1 inch (3.81 cm×2.54 cm). The foam density was 6.0 pounds per cubic foot (90 kg per cubic meter) and the cell size was about 0.5 mm.

This compared favorably to essentially the same Example being repeated, but with Quantum Spectratec FM 1570 concentrate of sodium bicarbonate/citric acid material used as the foaming agent, as compared to which the output from the extruder increased approximately 5% for the present material due to reduced screw slip resulting from higher friction in the feed section of the extruder.

Example 3

A) Preparation of resin pellets with adhesive binder.

50 pounds (22.7 kg) of flexible PVC pellets having a generally cubic shape of about 0.125 inch (0.318 cm) on each side were placed in a drum mixer of 18 inch (50.8 cm) diameter. 2.32 pounds (1.05 kg) of 55% by weight vinyl acetate emulsion (Rohm and Haas ROVACE 661) were added as an adhesive binder to the pellets by pouring over the surface of the pellets. The drum mixer was then rotated for 5 minutes until the pellets were uniformly coated.

B) Coating with additive agent.

5.8 pounds of 3.0 micron average particle size azodicarbonamide powder (Uniroyal AZ 130) as a foaming (i.e., expanding) agent were then sprinkled over the coated pellets while the mixer was rotating. Rotation was continued for 5 minutes until the pellets were uniformly coated and no dust or sticking occurred. Another 2.32 pounds (1.05 kg) of vinyl acetate were then added and mixed for 5 minutes. Another 5.8 pounds of azodicarbonamide powder were then added and mixed for 5 minutes by rotating the drum. Another 0.77 pound (0.35 kg) of vinyl acetate was then added and mixed for 3 minutes by rotating the drum to prevent the powder from dusting.

C) Drying.

The mixture was then spread out and allowed to dry at room temperature of approximately 80° F. (26.7° C.) for about 3 hours. A 20 inch (50.8 cm) diameter fan was used to circulate the air. Moisture tests were made and the mixture was found to be below 0.4% moisture after drying.

Example 4

A) Preparation of resin pellets with adhesive binder.

50 grams of polystyrene beads (reactor grade from Huntsman) of generally spherical shape of about 0.020 inch (0.051 cm) diameter were stirred by hand in an 8 ounce (0.24 liter) polyethylene terephthlate cup with 2.0 grams of vinyl acetate emulsion (Rohmand Haas ROVACE 661) as an adhesive binder for 2 minutes.

B) Coating with additive agent.

5.0 grams of azodicarbonamide powder (Uniroyal AZ 130) with a particle size of about 3 microns were sprinkled as a foaming (i.e., expanding) agent over the coated beads. Stirring was continued for 4 minutes in the cup until the beads were uniformly coated.

C) Drying.

The mixture was spread out and allowed to air dry for 5 minutes using a warm air fan dryer.

D) Testing.

The pellets were physically tested for powder dusting and flaking by rotating them in a clean 8 ounce (0.24 liter) polyethylene terephthlate cup and then they were visually inspected. No dust was observed and the beads appeared uniformly coated and free flowing.

Example 5

A) Preparation of resin pellets with adhesive binder.

50 grams of FEP pellets (Daikin NP-20) with about a 0.14 inch (0.356 cm) diameter by about a 0.070 inch (0.178 cm) length were mixed with 1.0 gram of water dispersible polyurethane elastometer (Reichold Spensol L52-MPW-30% solids) as an adhesive binder in an 8 ounce (0.24 liter) polyethylene terephthlate cup for 2 minutes.

B) Coating with additive agent.

2.5 grams of boron nitride powder (Carborundum SHP 325) with an average particle size of 3.5 microns as a physical nucleating agent were sprinkled over the coated pellets. Stirring was continued for 4 minutes in the cup until the pellets were uniformly coated.

C) Drying.

The mixture was spread out and allowed to air dry for 5 minutes using a warm air fan dryer.

D) Testing.

The pellets were physically tested for powder dusting and flaking by rotating them in a clean 8 ounce (0.24 liter) polyethylene terephthlate cup and then they were visually inspected. No dust was observed and the pellets appeared uniformly coated. The pellets are suitable for use in direct injection foam extrusion.

Example 6

A) Preparation and coating of resin pellets with adhesive binder.

50 grams of high density fractional melt polyethylene pellets (Union Carbide DFDA 3364 polyethylene) having a generally cylindrical shape with a diameter of about 0.15 inch (0.38 cm)×average length of about 0.160 inch (0.406 cm) were mixed with a 5 grams of a premixed liquid solution of vinyl acetate (Rohm and Haas ROVACE 661) as an adhesive binder and 5 grams of azodicarbonamide (Uniroyal AZ 130) as a foaming (i.e., expanding) agent by stirring the liquid mixture with the pellets in an 8 ounce (0.24 liter) polyethylene terephthlate cup for 5 minutes.

B) Drying.

The mixture was then spread out and allowed to dry for 5 minutes using a warm air fan dryer.

C) Results.

The mixture was very wet and sticky with large numbers of the pellets forming sticky agglomerates. The mixture formed one large solid mass upon further drying.

D) Conclusion.

This method of mixing the powder with the liquid thermoplastic adhesive prior to mixing with the pellets does not produce an extrudable product of resin pellets coated with an additive agent.

Example 7

A) Preparation of resin pellets with adhesive binder.

50 grams of high density fraction melt polyethylene pellets (Union Carbide DFDA 3364 polyethylene) having a generally cylindrical shape of about 0.150 inch (0.381 cm) in diameter x about 0.160 inch (0.406 cm) in average length, were stirred by hand in an 8 ounce (0.24 liter) polyethylene terephthlate cup with 2.0 grams of vinyl acetate emulsion (Rohm and Haas ROVACE 661) as an adhesive binder for 2 minutes.

B) Coating with additive agent.

5.0 grams of Phalo Blue No. 7 dry color pigment (Landers Segal LANSCO 3048) with a particle size of about 3 microns was sprinkled as a coloring agent over the coated beads. Stirring was continued for 4 minutes in the cup until the beads were uniformly coated.

C) Re-coating.

Another 1.0 gram of vinyl acetate emulsion (Rohm and Haas ROYACE 661) as an adhesive binder was added to the already coated pellets and the mixture was stirred for 4 minutes in the cup until the pellets were again uniformly coated.

D) Drying.

The mixture was spread out and allowed to air dry for 5 minutes using a warm air fan dryer.

E) Testing.

The pellets were physically tested for powder dusting and flaking by rotating them in a clean 8 ounce (0.24 liter) polyethylene terephthlate cup and then they were visually inspected. No dust was observed and the pellets appeared uniformly coated.

It will be understood that various details of the invention may be changed without departing from the scope of the invention. Furthermore, the foregoing description and laboratory examples are for the purpose of illustration only, and not for the purpose of limitation—the invention being defined by the claims.

What is claimed is:

1. A method for manufacturing an extruded plastic product consisting essentially of:

(a) uniformly distributing additive agent on polymeric resin to form an extrudable thermoplastic resin composition in particulate form by (i) contacting a polymeric resin in particulate form with a thermoplastic adhesive binder to form a coating of the binder directly adhered onto the surfaces of the resin particles, followed by (ii) contacting the binder-coated resin particles with an additive agent to form a uniform coating of the additive agent directly adhered onto the binder coating of the binder-coated resin particles, and (iii) wherein the binder is together with a solvent in a form selected from the group consisting of a solution, an emulsion, a dispersion, and combinations thereof;

(b) drying the resultant from step (a) to substantially remove the solvent; and (c) extruding the resultant from step (b) of dried resin particles having a coating of additive agent directly adhered onto the coating of binder that is directly adhered to the surfaces of the resin particles to form an extruded plastic product.

2. The method of claim 1, wherein the extruded plastic product is selected from the group consisting of a ribbon, a flexible plastic film, a foamed profile, and combinations thereof.

3. The method of claim 2, wherein the flexible plastic film is selected from the group consisting of oriented film, non-oriented film, and combinations thereof.

4. The method of claim 1, comprising repeating step (a) at least once prior to performing step (c).

5. The method of claim 1, wherein the binder together with a solvent is in aqueous form.

6. The method of claim 5, comprising repeating step (a) at least once prior to performing step (c).

7. The method of claim 1, wherein during contacting in step (a), the additive agent, the binder, and the resin particles are present in an amount of about 1 part by weight to about 40 parts by weight of additive agent per about 100 parts by weight of resin particles and about 30 parts by weight to about 50 parts by weight of binder per about 100 parts by weight of additive agent.

8. The method of claim 1, wherein the polymeric resin is selected from the group consisting of polystyrene, butadiene-styrene copolymer, acrylonitrile-butadiene-styrene terpolymer, ethylene vinyl acetate copolymer, polytetrafluoroethylene-co-hexafluoropropylene, polyvinyl chloride, polyamide, polypropylene, polyethylene, and combinations thereof.

9. The method of claim 1, wherein the binder is selected from the group consisting of a vinyl acetate homopolymer, a polyurethane, a polyacrylic, and combinations thereof.

10. The method of claim 1, wherein the additive agent is selected from the group consisting of anti-blocking agents, antifogging agents, slip agents, anti-microbial agents, pigments, flame retardants, anti-oxidant agents, nucleating agents, heat stabilizers, impact modifiers, plasticizers, lubricants, thickeners, ultraviolet stabilizers, anti-static agents, wetting agents, and combinations thereof.

11. The method of claim 10, wherein the nucleating agent is selected from the group consisting of boron nitride, a mixture of sodium bicarbonate and citric acid, azodicarbonamide, talc, polytetrafluoroethylene powder, and combinations thereof.

12. The method of claim 1, wherein the form selected from the group consisting of a solution, an emulsion, a dispersion, and combinations thereof contains about 30% to about binder on a solids basis with the remainder being the solvent.

13. The method of claim 12, wherein the solvent is water.

* * * * *